(12) United States Patent
Ichihashi et al.

(10) Patent No.: US 6,617,077 B1
(45) Date of Patent: Sep. 9, 2003

(54) POLYMER ELECTROLYTE BATTERY AND METHOD OF FABRICATING THE SAME

(75) Inventors: Akira Ichihashi, Sumoto (JP); Yoshinori Kida, Katano (JP); Ryuji Ohshita, Neyagawa (JP); Hiroshi Kurokawa, Katano (JP); Maruo Kamino, Katano (JP); Shin Fujitani, Hirakata (JP); Koji Nishio, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/450,506

(22) Filed: Nov. 30, 1999

(30) Foreign Application Priority Data

Nov. 30, 1998 (JP) .............................. 10/338679
Oct. 29, 1999 (JP) .............................. 11/308413

(51) Int. Cl.$^7$ .............................. H01M 6/18; H01M 6/14
(52) U.S. Cl. .................... 429/309; 429/303; 252/62.2
(58) Field of Search ................ 429/309, 303, 429/305, 306; 252/62.2

(56) References Cited

U.S. PATENT DOCUMENTS

| | | | |
|---|---|---|---|
| 4,908,283 A | | 3/1990 | Takahashi et al. |
| 5,897,974 A | * | 4/1999 | LaFleur ...................... 429/309 |
| 5,925,283 A | * | 7/1999 | Taniuchi et al. ............ 252/62.2 |
| 5,958,997 A | * | 9/1999 | Eunkyoung et al. ........ 522/182 |

FOREIGN PATENT DOCUMENTS

| | | |
|---|---|---|
| JP | 62-219468 | 9/1987 |
| JP | 5-36305 | 2/1993 |
| JP | 5-67475 | 3/1993 |

\* cited by examiner

Primary Examiner—Patrick Ryan
Assistant Examiner—Julian Mercado
(74) Attorney, Agent, or Firm—Armstrong, Westerman & Hattori, LLP

(57) ABSTRACT

In a polymer electrolyte battery provided with a positive electrode, a negative electrode, and a polymer electrolyte, a polymer-based material containing a copolymer of ethylene glycol (meth)acrylate compound represented by the following general formula (1) and alkyl (meth)acrylate represented by the following general formula (2) is used as said polymer electrolyte.

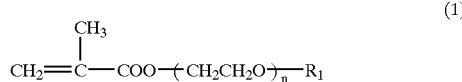

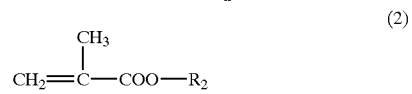

17 Claims, 1 Drawing Sheet

POLYMER ELECTROLYTE BATTERY AND METHOD OF FABRICATING THE SAME

BACKGROUND OF THE INVENTION

Field of the Invention

The present invention relates generally to a polymer electrolyte battery provided with a positive electrode, a negative electrode, and a polymer electrolyte, and a method of fabricating the polymer electrolyte battery, and more particularly, to a polymer electrolyte battery characterized in that a polymer electrolyte is modified to improve charge/discharge cycle performance of the battery.

Description of the Related Art

Recently, as one type of advanced batteries featuring high power and high energy density, non-aqueous electrolyte batteries with high energy density have been used. The non-aqueous electrolyte battery employs a non-aqueous electrolyte solution and utilizes a process of oxidation and reduction of lithium and lithium ions.

In the case of the above-mentioned non-aqueous electrolyte battery, however, problems exist that the non-aqueous electrolyte solution leaks out of the battery and that the non-aqueous electrolyte solution reacts with a positive electrode or a negative electrode to degrade the battery characteristics.

Therefore, more recently, the spotlight is on a polymer electrolyte battery employing a polymer electrolyte comprising a polymer-based material containing an electrolyte or a non-aqueous electrolyte solution.

Such a polymer electrolyte battery has conventionally generally employed a polymer electrolyte comprising a polymer-based material such as poly(ethylene oxide) and polyvinylidene fluoride containing a lithium salt such as $LiPF_6$ as an electrolyte, or a gelated polymer electrolyte obtained by impregnating the above-mentioned polymer-based material with a non-aqueous electrolyte obtained by dissolving the above-mentioned electrolyte in an organic solvent such as carbonic ester.

However, poly(ethylene oxide), polyvinylidene fluoride, or the like, which has been conventionally utilized as a polymer-based material, generally suffers low ion conductivity and poor chemical stability and hence, charge/discharge cycle performance of the polymer electrolyte battery is degraded.

Therefore, in recent years, in order to improve the ion conductivity and the chemical stability of a polymer-based material, a polymer electrolyte battery employing the polymer-based material obtained by coporimerizing two types of (meth)acrylate or acrylate has been proposed, as disclosed in Japanese Patent Laid-Open No. 32022/1995.

Unfortunately, however, even when a copolymer disclosed in the gazette is used as a polymer-based material, the ion conductivity and the chemical stability of the polymer-based material are not sufficiently improved. Further, when the polymer-based material is gelated by being impregnated with a non-aqueous electrolyte solution, the polymer-based material can not sufficiently hold the non-aqueous electrolytic solution, whereby the charge/discharge cycle performance of the polymer electrolyte battery cannot be sufficiently improved.

SUMMARY OF THE INVENTION

A first object of the present invention is to improve, in a polymer electrolyte battery provided with a positive electrode, a negative electrode, and a polymer electrolyte, the ion conductivity and the chemical stability of the polymer electrolyte.

A second object of the present invention is to enable the above-mentioned polymer electrolyte to sufficiently hold a non-aqueous electrolyte solution.

A third object of the present invention is to improve charge/discharge cycle performance of a polymer electrolyte battery.

In a polymer electrolyte battery provided with a positive electrode, a negative electrode, and a polymer electrolyte, a polymer electrolyte battery according to the invention is characterized in that a polymer-based material containing a copolymer of ethylene glycol (meth)acrylate compound represented by the following general formula (1) and alkyl (meth)acrylate represented by the following general formula (2) is used as said polymer electrolyte.

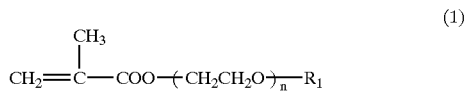 (1)

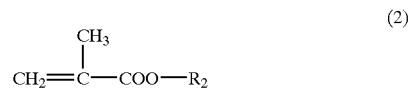 (2)

As in the polymer electrolyte battery according to the present invention, when the polymer-based material containing a copolymer of the ethylene glycol (meth)acrylate compound represented by the foregoing general formula (1) and the alkyl (meth)acrylate represented by the foregoing general formula (2) is used as the polymer electrolyte, the ion conductivity and the chemical stability of the polymer electrolyte are improved and a non-aqueous electrolyte solution is sufficiently held in the polymer electrolyte. As a result, resistance on the surfaces at which the polymer electrolyte contacts with the positive electrode and the negative electrode is reduced so that charge/discharge cycle performance of the polymer electrolyte battery is improved.

Further, when ethylene glycol (meth)acrylate compound represented by the foregoing general formula (1) wherein $R_1$ indicates an alkyl group having 9 or more carbon atoms is used as said ethylene glycol (meth)acrylate compound represented by the general formula (1), it is considered that alkyl groups are tangled with each other to form a three-dimensional bridge structure, so that the stability and the uniformity of the polymer electrolyte is improved, whereby the charge/discharge cycle performance of the polymer electrolyte battery is further improved.

When an ethylene glycol chain in said ethylene glycol (meth)acrylate compound is too long, a copolymer containing the ethylene glycol (meth)acrylate compound is dissolved in a non-aqueous electrolyte solution. Therefore, it is preferable to use ethylene glycol (meth)acrylate compound represented by the foregoing general formula (1) wherein n indicates an integer of 1 to 25.

On the other hand, when alkyl (meth)acrylate represented by the foregoing general formula (2) wherein $R_2$ indicates an alkyl group having not more than 3 carbon atoms is used as said alkyl (meth)acrylate, the polymer-based material obtained is dissolved in the non-aqueous electrolyte solution. Therefore, it is necessary to use alkyl (meth)acrylate represented by the foregoing general formula (2) wherein $R_2$ indicates an alkyl group having 4 or more carbon atoms. In order to further prevent the polymer-based material from being dissolved in the non-aqueous electrolyte solution, it is preferable to use alkyl (meth)acrylate represented by the foregoing general formula (2) wherein $R_2$ indicates an alkyl group having 6 or more carbon atoms.

Further, in the polymer electrolyte battery according to the present invention, as the above-mentioned polymer electrolyte, it is possible to use a solid polymer electrolyte comprising a polymer-based material containing an electrolyte, or a gelled polymer electrolyte comprising a polymer-based material impregnated with a non-aqueous electrolyte solution obtained by dissolving an electrolyte in an organic solvent.

As an electrolyte used in a polymer electrolyte, it is possible to use a known electrolyte which has been conventionally used. Examples of such an electrolyte include lithium compounds such as lithium hexafluorophosphate $LiPF_6$, lithium perchlorate $LiClO_4$, lithium tetrafluoroborate $LiBF_4$, and lithium trifluoromethanesulfonate $LiCF_3SO_3$. Specifically, in order to prevent the polymer electrolyte from being decomposed, it is preferable to use an imido electrolyte represented by $LiN(C_mF_{2m+1}SO_2)_2$. When the molecular weight of the imido electrolyte is too large, the ion conductivity of the polymer electrolyte battery is degraded. Therefore, it is preferable to use the imido electrolyte represented by the above-mentioned formula wherein m indicates an integer of 1 to 4. For example, lithium trifluoromethanesulfonimide $LiN(CF_3SO_2)_2$ is preferably used.

As a solvent dissolving the above-mentioned electrolyte, it is possible to use known solvents which have been conventionally used. For example, an organic solvents such as propylene carbonate, ethylene carbonate, γ-butyrolactone, butylene carbonate, 1,2-dimethoxyethane, dimethyl carbonate, diethyl carbonate, and the like can be used. These solvents may be used alone or in combination of two or more types.

In the polymer electrolyte battery according to the present invention, it is possible to use, as a positive electrode material for use in its positive electrode, a known positive electrode material that has been conventionally generally used. Examples of a usable positive electrode material include transition metal compounds capable of occluding and discharging lithium ions, which are represented by metal oxides containing at least one of manganese, cobalt, nickel, vanadium, and niobium and the like. Specifically, $LiCoO_2$, $LiNiO_2$, $LiMnO_2$, and the like can be used.

As a negative electrode material for use in its negative electrode, it is possible to use a known negative electrode material that has been conventionally generally used. Examples of a usable negative electrode material include carbon materials capable of occluding and discharging lithium ions such as artificial graphite and natural graphite, lithium metals, lithium alloys, $Li_4Ti_5O_{12}$, and $TSi_2$.

Further, in fabricating the polymer electrolyte battery according to the present invention, the battery can be fabricated in such a manner that ethylene glycol (meth)acrylate compound represented by the foregoing general formula (1) and alkyl (meth)acrylate represented by the foregoing general formula (2) are copolymerized to fabricate a polymer electrolyte, after which the polymer electrolyte is contained in the battery so as to be sandwiched between a positive electrode and a negative electrode, or in such a manner that ethylene glycol (meth)acrylate compound represented by the foregoing general formula (1) and alkyl (meth)acrylate represented by the foregoing general formula (2) are copolymerized to fabricate a polymer electrolyte in the battery. When the polymer electrolyte is fabricated in the battery as described above, resistance on the surfaces at which the polymer electrolyte contacts with the positive electrode and the negative electrode is further reduced so that the battery characteristics are improved.

These and other objects, advantages and features of the invention will become apparent from the following description thereof taken in conjunction with the accompanying drawings that illustrate specific embodiments of the invention.

DESCRIPTION OF THE PREFERRED EMBODIMENTS

Figure 1:
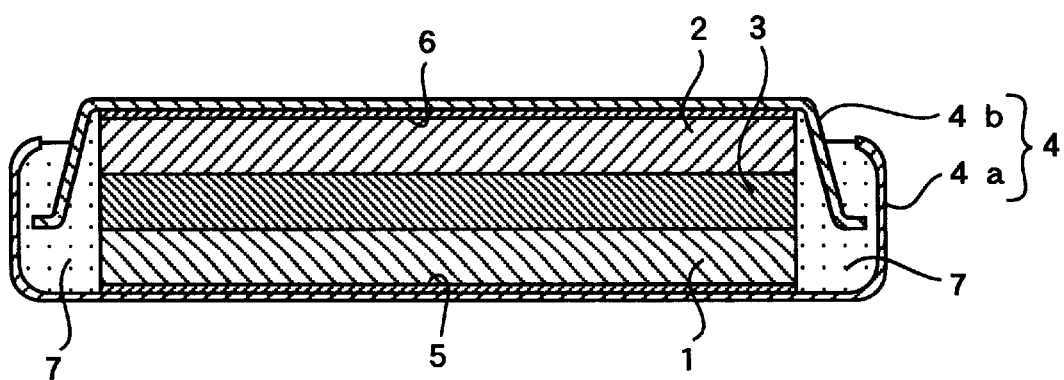
FIG. 1 is a sectional illustration showing the internal construction of each of the polymer electrolyte batteries fabricated in examples and comparative examples of the present invention.

Polymer electrolyte batteries according to examples of the present invention will be specifically described, and comparative examples will be taken, to make it clear that the polymer electrolyte batteries of examples accomplish improvement in the charge/discharge cycle performance. It should be appreciated that the polymer electrolyte batteries according to the present invention are not particularly limited to those in the following examples, and various changes and modifications may be made in the invention without departing from the spirit and scope thereof.

EXAMPLES 1 TO 6 AND COMPARATIVE EXAMPLES 1

In each of the examples 1 to 6 and the comparative example 1, there were used a positive electrode, a negative electrode, and a polymer electrolyte fabricated in the following manners, respectively, so as to fabricate a flat coin-type polymer electrolyte battery as shown in FIG. 1.

<Fabrication of Positive Electrode>

In fabricating a positive electrode, a lithium-containing composite cobalt dioxide $LiCoO_2$ was used as a positive electrode material. The positive electrode material $LiCoO_2$, artificial carbon as a conductive agent, and polyvinylidene fluoride as a binding agent were mixed in the weight ratio of 90:5:5. N-methyl-2-pyrolidone was added to a mixture obtained, and the mixture was brought into a slurry. Next, the slurry was applied to one side of an aluminum foil as a positive-electrode current collector by means of the doctor blade coating method. The slurry on the positive-electrode current collector was then subjected to vacuum drying at 130° C. for 2 hours, to obtain the positive electrode.

<Fabrication of Negative Electrode>

In fabricating a negative electrode, graphite ($d_{002}$=3.35 Å) was used as a negative electrode material. The graphite and polyvinylidene fluoride as a binding agent were mixed in the weight ratio of 95:5. N-methyl-2-pyrolidone was added to a mixture obtained, and the mixture was brought into a slurry. Next, the slurry was applied to one side of a copper foil as a negative-electrode current collector by means of the doctor blade coating method. The slurry on the negative-electrode current collector was then subjected to vacuum drying at 130° C. for 2 hours, to obtain the negative electrode.

<Fabrication of Polymer Electrolyte and Battery>

In fabricating a polymer electrolyte, in each of the examples 1 to 6, there were used as monomers to constitute a polymer-based material alkyl (meth)acrylate represented by the foregoing general formula (2) wherein $R_2$ indicates an alkyl group having 4 carbon atoms and ethylene glycol (meth)acrylate compound represented by the foregoing general formula (1) wherein n indicates 4 and the number of carbon atoms in $R_1$ was modified, as shown in the following Table 1. These monomers were mixed in a molar ratio of 1:1.

As the above-mentioned ethylene glycol (meth)acrylate compound, ethylene glycol (meth)acrylate compound of the foregoing general formula (1) wherein $R_1$ has 1 carbon atom was used in the example 1, ethylene glycol (meth)acrylate compound of the foregoing general formula (1) wherein $R_1$ has 2 carbon atoms was used in the example 2, ethylene glycol (meth)acrylate compound of the foregoing general formula (1) wherein $R_1$ has 4 carbon atoms was used in the example 3, ethylene glycol (meth)acrylate compound of the foregoing general formula (1) wherein $R_1$ has 9 carbon atoms was used in the example 4, ethylene glycol (meth)acrylate compound of the foregoing general formula (1) wherein $R_1$ has 12 carbon atoms was used in the example 5, and ethylene glycol (meth)acrylate compound of the foregoing general formula (1) wherein $R_1$ has 16 carbon atoms was used in the example 6.

On the other hand, in the comparative example 1, as monomers to constitute a polymer-based material, there were used alkyl (meth)acrylate represented by the foregoing general formula (2) wherein $R_2$ indicates an alkyl group having 4 or more carbon atoms similar to the above-mentioned examples 1 to 6 and ethylene glycol (meth)acrylate compound represented by the foregoing general formula (2) wherein n indicates 0 and $R_1$ has 1 carbon atom, as shown in the following Table 1. These monomers were mixed in a molar ratio of 1:1.

Further, in preparing a non-aqueous electrolyte solution, a mixed solvent containing ethylene carbonate and diethyl carbonate in a volume ratio of 1:1 was used, and lithium pentafluoroethanesulfonimide $LiN(C_2F_5SO_2)_2$ was dissolved in the mixed solvent in a proportion of 1 mole/liter to prepare the non-aqueous electrolyte solution.

The mixture containing two types of monomers as described above and the above-mentioned non-aqueous electrolyte solution were mixed in a weight ratio of 1:2, to prepare each solution for fabricating a polymer electrolyte.

In fabricating each polymer electrolyte battery using each solution for fabricating a polymer electrolyte thus prepared, a porous film made of polypropylene was interposed as a separator (not shown) between a positive electrode 1 and negative electrode 2 respectively fabricated in the above-mentioned manners, after which they were contained in a positive-electrode can 4a in a manner that a positive-electrode current collector 5 in the positive electrode 1 was in contact with the positive-electrode can 4a, and t-Butyl Peroxyoctoate as a polymerization initiator as well as the above-mentioned solution for fabricating a polymer electrolyte was added to the positive-electrode can 4a so that the above-mentioned separator was impregnated with the solution for fabricating a polymer electrolyte, as shown in FIG. 1.

Then, a negative-electrode can 4b was provided on the above-mentioned positive-electrode can 4a with an insulating packing 7 being interposed therebetween so that a negative-electrode current collector 6 in the negative electrode 2 was in contact with the negative-electrode can 4b. In this state, two types of monomers contained in the solution for fabricating a polymer electrolyte was copolymerized at 60° C. for 6 hours, to fabricate each of the polymer electrolyte batteries in the examples 1 to 6 and the comparative example 1 wherein the polymer electrolyte 3 was provided between the above-mentioned positive electrode 1 and negative electrode 2.

EXAMPLES 7 TO 12

In each of the examples 7 to 12, there were used as monomers to constitute a polymer-based material alkyl (meth)acrylate represented by the foregoing general formula (2) wherein $R_2$ indicates an alkyl group having 4 carbon atoms similar to the above-mentioned examples 1 to 6 and ethylene glycol (meth)acrylate compound represented by the foregoing general formula (1) wherein n indicates 4 and the number of carbon atoms in $R_1$ were modified, as shown in the following Table 1. These monomers were mixed in a molar ratio of 1:1.

As the above-mentioned ethylene glycol (meth)acrylate compound, ethylene glycol (meth)acrylate compound of the foregoing general formula (1) wherein $R_1$ has 1 carbon atom was used in the example 7, ethylene glycol (meth)acrylate compound of the foregoing general formula (1) wherein $R_1$ has 2 carbon atoms was used in the example 8, ethylene glycol (meth)acrylate compound of the foregoing general formula (1) wherein $R_1$ has 4 carbon atoms was used in the example 9, ethylene glycol (meth)acrylate compound of the foregoing general formula (1) wherein $R_1$ has 9 carbon atoms was used in the example 10, ethylene glycol (meth)acrylate compound of the foregoing general formula (1) wherein $R_1$ has 12 carbon atoms was used in the example 11, and ethylene glycol (meth)acrylate compound of the foregoing general formula (1) wherein $R_1$ has 16 carbon atoms was used in the example 12.

Further, in each of the examples 7 to 12, the same non-aqueous electrolyte solution as that in the above-mentioned examples 1 to 6 and comparative example 1 was used. The mixture containing two types of monomers as described above and the non-aqueous electrolyte solution were mixed in a weight ratio of 1:2 to prepare each solution for fabricating a polymer electrolyte.

Subsequently, ultraviolet rays were irradiated to each solution for fabricating a polymer electrolyte to copolymerize two types of monomers contained therein. Each polymer electrolyte 3 of gel type having a thickness of approximately 30 μm was thus obtained.

In the examples 7 to 12, the above-mentioned each polymer electrolyte 3 was interposed between a positive electrode 1 and negative electrode 2 respectively fabricated in the same manners as those in the above-mentioned examples 1 to 6 and comparative example 1, after which they were contained in a battery can 4 comprising a positive-electrode can 4a and a negative-electrode can 4b, to fabricate each polymer electrolyte battery.

Each of the polymer electrolyte batteries in the examples 1 to 12 and the comparatives example 1 fabricated as described above was charged with constant current of 1 mA to a charge cut-off voltage of 4.1 V, and was then discharged with constant current of 1 mA to a discharge cut-off voltage of 2.5 V. The above-mentioned charging and discharging were considered as one cycle. 100 cycles of charging and discharging were performed to measure a discharging capacity $Q_1$ at the first cycle time and a discharging capacity $Q_{100}$ at the 100th cycle time. The percentage of capacity retention at the 100th cycle time was then found on the basis of the following equation. The results were shown in the following Table 1.

Percentage of capacity retention (%)=$(Q_{100}/Q_1) \times 100$

TABLE 1

| | number of carbon atoms in $R_1$ | n | number of carbon atoms in $R_2$ | percentage of capacity retention (%) |
|---|---|---|---|---|
| example 1 | 1 | 4 | 4 | 90 |
| example 2 | 2 | 4 | 4 | 90 |
| example 3 | 4 | 4 | 4 | 91 |
| example 4 | 9 | 4 | 4 | 99 |
| example 5 | 12 | 4 | 4 | 98 |
| example 6 | 16 | 4 | 4 | 98 |
| example 7 | 1 | 4 | 4 | 88 |
| example 8 | 2 | 4 | 4 | 88 |
| example 9 | 4 | 4 | 4 | 89 |
| example 10 | 9 | 4 | 4 | 97 |
| example 11 | 12 | 4 | 4 | 96 |
| example 12 | 16 | 4 | 4 | 96 |
| comparative example 1 | 1 | 0 | 4 | 65 |

As apparent from the results, each of the polymer electrolyte batteries in the examples 1 to 12 presented increased percentage of capacity retention at the 100th cycle time and improved in charge/discharge cycle performance as compared with the polymer electrolyte battery in the comparative example 1 employing the alkyl (meth)acrylate represented by the same general formula (2) as that in the examples 1 to 12 and a monomer represented by the foregoing general formula (1) wherein n indicates 0. Particularly, each of the polymer electrolyte batteries in the examples 4 to 6 and 10 to 12 employing ethylene glycol (meth)acrylate compound represented by the foregoing general formula (1) wherein $R_1$ indicates an alkyl group having 9 or more carbon atoms presented further increased percentage of capacity retention at the 100th cycle time and further improved in charge/discharge cycle performance.

Further, when the polymer electrolyte batteries in the examples 1 to 6 were compared with the polymer electrolyte batteries in the examples 7 to 12, it was found that each of the polymer electrolyte batteries in the examples 1 to 6 in which two types of monomers were copolymerized in the battery to fabricate polymer electrolyte presented increased percentage of capacity retention at the 100th cycle time and improved in charge/discharge cycle performance as compared with each of the polymer electrolyte batteries in the examples 7 to 12 corresponding to these examples.

EXAMPLES 13 TO 16

In each of the examples 13 to 16, in fabricating a polymer electrolyte, there were used as monomers to constitute a polymer-based material alkyl (meth)acrylate represented by the foregoing general formula (2) wherein $R_2$ indicates an alkyl group having 4 or more carbon atoms similar to the above-mentioned examples 1 to 6 and ethylene glycol (meth)acrylate compound represented by the foregoing general formula (1) wherein $R_1$ indicates an alkyl group having 9 carbon atoms and n was modified, as shown in the following Table 2.

As the above-mentioned ethylene glycol (meth)acrylate compound, ethylene glycol (meth)acrylate compound of the foregoing general formula (1) wherein n indicates 1 was used in the example 13, ethylene glycol (meth)acrylate compound of the foregoing general formula (1) wherein n indicates 15 was used in the example 14, ethylene glycol (meth)acrylate compound of the foregoing general formula (1) wherein n indicates 25 was used in the example 15, and ethylene glycol (meth)acrylate compound of the foregoing general formula (1) wherein n indicates 30 was used in the example 16, as shown in the following Table 2.

Each of the polymer electrolyte batteries in the examples 13 to 16 was fabricated in the same manner as that in the above-mentioned examples 1 to 6, except that two types of monomers as described above were used as monomers to constitute a polymer-based material.

With respect to each of the polymer electrolyte batteries according to the examples 13 to 16, the discharge capacities at the 1st cycle time and at the 100th cycle time were measured in the same manner as that in the above-mentioned case, to find the percentage of capacity retention (%) on the basis of the foregoing equation. The results, along with those of the above-mentioned example 4 and comparative example 1, are shown in the following Table 2.

TABLE 2

| | number of carbon atoms in $R_1$ | n | number of carbon atoms in $R_2$ | percentage of capacity retention (%) |
|---|---|---|---|---|
| example 13 | 9 | 1 | 4 | 95 |
| example 4 | 9 | 4 | 4 | 99 |
| example 14 | 9 | 15 | 4 | 99 |
| example 15 | 9 | 25 | 4 | 97 |
| example 16 | 9 | 30 | 4 | 89 |
| comparative example 1 | 1 | 0 | 4 | 65 |

As apparent from the results, each of the polymer electrolyte batteries in the examples 13 to 16 presented increased percentage of capacity retention at the 100th cycle time and improved in charge/discharge cycle performance as compared with the polymer electrolyte battery in the above-mentioned comparative example 1. Particularly, each of the polymer electrolyte batteries in the examples 4 and 13 to 15 employing ethylene glycol (meth)acrylate compound wherein n indicates an integer of 1 to 25 presented further increased percentage of capacity retention at the 100th cycle time and further improved in charge/discharge cycle performance.

EXAMPLES 17 TO 21 AND COMPARATIVE EXAMPLE 2

In each of the examples 17 to 21 and the comparative example 2, in fabricating a polymer electrolyte, there were used as monomers to constitute a polymer-based material, alkyl (meth)acrylate represented by the foregoing general formula (2) wherein $R_2$ indicates an iso-bornyl group having 10 carbon atoms and ethylene glycol (meth)acrylate compound represented by the foregoing general formula (1) wherein $R_1$ indicates an alkyl group having 1 carbon atom and n was modified, as shown in the following Table 3.

As the above-mentioned ethylene glycol (meth)acrylate compound, ethylene glycol (meth)acrylate compound of the foregoing general formula (1) wherein n indicates 1 was used in the example 17, ethylene glycol (meth)acrylate compound of the foregoing general formula (1) wherein n indicates 4 was used in the example 18, ethylene glycol (meth)acrylate compound of the foregoing general formula (1) wherein n indicates 15 was used in the example 19, ethylene glycol (meth)acrylate compound of the foregoing general formula (1) wherein n indicates 25 was used in the example 20, and ethylene glycol (meth)acrylate compound of the foregoing general formula (1) wherein n indicates 30 was used in the example 21, while ethylene glycol (meth) acrylate compound of the foregoing general formula (1) wherein n indicates 0 was used in the comparative example 2, as shown in the following Table 3.

Each of the polymer electrolyte batteries in the examples 17 to 21 and the comparative example 2 was fabricated in the same manner as that in the above-mentioned examples 1 to 6, except that two types of monomers as described above were used as monomers to constitute a polymer-based material.

With respect to each of the polymer electrolyte batteries according to examples 17 to 21 and the comparative example 2, the discharge capacities at the 1st cycle time and at the 100th cycle time were measured in the same manner as that in the above-mentioned case, to find the percentage of capacity retention (%) on the basis of the foregoing equation. The results are shown in the following Table 3.

TABLE 3

|  | number of carbon atoms in $R_1$ | n | number of carbon atoms in $R_2$ | percentage of capacity retention (%) |
| --- | --- | --- | --- | --- |
| example 17 | 1 | 1 | 10 | 92 |
| example 18 | 1 | 4 | 10 | 96 |
| example 19 | 1 | 15 | 10 | 95 |
| example 20 | 1 | 25 | 10 | 92 |
| example 21 | 1 | 30 | 10 | 88 |
| comparative example 2 | 1 | 0 | 10 | 65 |

As apparent from the results, each of the polymer electrolyte batteries in the examples 17 to 21 presented increased percentage of capacity retention at the 100th cycle time and improved in charge/discharge cycle performance as compared with the polymer electrolyte battery in the comparative example 2 employing the alkyl (meth)acrylate represented by the same general formula (2) as that in the examples 17 to 21 and a monomer represented by the foregoing general formula (1) wherein n indicates 0. Particularly, each of the polymer electrolyte batteries in the examples 17 to 20 employing ethylene glycol (meth)acrylate compound wherein n indicates an integer of 1 to 25 presented further increased percentage of capacity retention at the 100th cycle time and further improved in charge/discharge cycle performance.

EXAMPLES 22 TO 26 AND COMPARATIVE EXAMPLES 3 AND 4

In each of the examples 22 to 26 and the comparative examples 3 and 4, in fabricating a polymer electrolyte, there were used as monomers to constitute a polymer-based material ethylene glycol (meth)acrylate compound represented by the foregoing general formula (1) wherein $R_1$ indicates an alkyl group having 1 carbon atom and n indicates 4, and alkyl (meth)acrylate represented by the foregoing general formula (2) wherein the number of carbon atoms in $R_2$ was modified, as shown in the following Table 4.

As the above-mentioned alkyl (meth)acrylate, alkyl (meth)acrylate of the foregoing general formula (2) wherein $R_2$ indicates an iso-bornyl group having 4 carbon atoms was used in the example 22, alkyl (meth)acrylate of the foregoing general formula (2) wherein $R_2$ indicates a n-butyl group having 4 carbon atoms was used in the example 23, alkyl (meth)acrylate of the foregoing general formula (2) wherein $R_1$ indicates a cyclohexyl group having 6 carbon atoms was used in the example 24, alkyl (meth)acrylate of the foregoing general formula (2) wherein $R_2$ indicates a lauryl group having 12 carbon atoms was used in the example 25, and alkyl (meth) acrylate of the foregoing general formula (2) wherein $R_2$ indicates a hexadecyl group having 6 carbon atoms was used in the example 26, while alkyl (meth) acrylate of the foregoing general formula (2) wherein $R_2$ indicates an iso-propyl group having 3 carbon atoms was used in the comparative example 3 and alkyl (meth)acrylate of the foregoing general formula (2) wherein $R_2$ indicates an ethyl group having 2 carbon atoms was used in the comparative example 4, as shown in the following Table 4.

Each of the polymer electrolyte batteries in the examples 22 to 26 and the comparative examples 3 and 4 was fabricated in the same manner as that in the above-mentioned examples 1 to 6, except that two types of monomers as described above were used as monomers to constitute a polymer-based material.

With respect to each of the polymer electrolyte batteries according to examples 22 to 26 and the comparative examples 3 and 4, the discharge capacities at the 1st cycle time and at the 100th cycle time were measured in the same manner as that in the above-mentioned case, to find the percentage of capacity retention (%) on the basis of the foregoing equation. The results, along with that of the above-mentioned example 18, are shown in the following Table 4.

TABLE 4

|  | number of carbon atoms in $R_1$ | n | number of carbon atoms in $R_2$ | percentage of capacity retention (%) |
| --- | --- | --- | --- | --- |
| example 22 | 1 | 4 | 4 | 90 |
| example 23 | 1 | 4 | 4 | 87 |
| example 24 | 1 | 4 | 6 | 96 |
| example 18 | 1 | 4 | 10 | 96 |
| example 25 | 1 | 4 | 12 | 95 |
| example 26 | 1 | 4 | 16 | 95 |
| comparative example 3 | 1 | 4 | 3 | 62 |
| comparative example 4 | 1 | 4 | 2 | 57 |

As apparent from the results, each of the polymer electrolyte batteries in the examples 18 and 22 to 26 presented increased percentage of capacity retention at the 100th cycle time and improved in charge/discharge cycle performance as compared with each of the polymer electrolyte batteries in the comparative examples 3 and 4 employing the alkyl (meth)acrylate wherein $R_2$ indicates an alkyl group having less than 4 carbon atoms. Particularly, each of the polymer electrolyte batteries in the examples 18 and 24 to 26 employing alkyl (meth)acrylate wherein $R_2$ indicates an alkyl group having 6 or more carbon atoms presented further increased percentage of capacity retention at the 100th cycle time and further improved in charge/discharge cycle performance.

EXAMPLES 27 TO 32

In each of the examples 27 to 32, similar to the above-mentioned example 18, there were used as monomers to constitute a polymer-based material ethylene glycol (meth) acrylate compound represented by the foregoing general formula (1) wherein $R_1$ indicates an alkyl group having 1 carbon atom and n indicates 4 and alkyl (meth)acrylate represented by the foregoing general formula (2) wherein $R_2$ indicates an iso-bornyl group having 10 carbon atoms. These monomers were mixed in a molar ratio of 1:1.

In each of the examples 27 to 32, in preparing a non-aqueous electrolyte solution, a mixed solvent containing ethylene carbonate and diethyl carbonate in a volume ratio of 1:1 was used, and a type of electrolyte dissolved in the mixed solvent was modified as shown in the following Table 5.

As the above-mentioned electrolyte, $LiN(CF_3SO_2)_2$ was used in the example 27, $LiN(C_3F_7SO_2)_2$ was used in the example 28, $LiN(C_4F_9SO_2)_2$ was used in the example 29, $LiN(C_5F_{11}SO_2)_2$ was used in the example 30, $LiPF_6$ was used in the example 31, and $LiBF_4$ was used in the example 32. Each of these electrolytes was dissolved in the above-mentioned mixed solvent in a proportion of 1 mole/liter, to prepare each of the non-aqueous electrolyte solutions.

Each of the polymer electrolyte batteries in the examples 27 to 32 was fabricated in the same manner as that in the above-mentioned examples 1 to 6, except that each of the mixtures obtained by mixing two types of monomers as described above and the above-mentioned non-aqueous electrolyte solutions were mixed in a weight ratio 1:2, to prepare each solution for fabricating a polymer electrolyte.

With respect to each of the polymer electrolyte batteries according to the examples 27 to 32, the discharge capacities at the 1st cycle time and at the 100th cycle time were measured in the same manner as that in the above-mentioned case, to find the percentage of capacity retention (%) on the basis of the foregoing equation. The results, along with that of the above-mentioned example 18, are shown in the following Table 5.

TABLE 5

| | number of carbon atoms in $R_1$ | n | number of carbon atoms in $R_2$ | type of electrolyte | percentage of capacity retention (%) |
|---|---|---|---|---|---|
| example 18 | 1 | 4 | 10 | $LiN(C_2F_5SO_2)_2$ | 96 |
| example 27 | 1 | 4 | 10 | $LiN(CF_3SO_2)_2$ | 95 |
| example 28 | 1 | 4 | 10 | $LiN(C_3F_7SO_2)_2$ | 95 |
| example 29 | 1 | 4 | 10 | $LiN(C_4F_9SO_2)_2$ | 96 |
| example 30 | 1 | 4 | 10 | $LiN(C_5F_{11}SO_2)_2$ | 88 |
| example 31 | 1 | 4 | 10 | $LiPF_6$ | 88 |
| example 32 | 1 | 4 | 10 | $LiBF_4$ | 89 |

As apparent from the results, each of the polymer electrolyte batteries in the examples 27 to 28 presented increased percentage of capacity retention at the 100th cycle time and improved in charge/discharge cycle performance as compared with the polymer electrolyte batteries in the above-mentioned comparative examples 1 to 4.

Further, each of the polymer electrolyte batteries in the examples 18 and 27 to 29 employing as an electrolyte an imido electrolyte represented by $LiN(C_mF_{2m+1}SO_2)_2$ wherein m indicates an integer of 1 to 4 presented further increased percentage of capacity retention at the 100th cycle time and further improved in charge/discharge cycle performance as compared with the polymer electrolyte batteries in the examples 30 to 32 respectively employing imido electrolyte wherein m indicates 5, $LiPF_6$, and $LiBF_4$.

EXAMPLES 33 TO 38

In each of the examples 33 to 38, similar to the above-mentioned example 4, there were used as monomers to constitute a polymer-based material ethylene glycol (meth) acrylate compound represented by the foregoing general formula (1) wherein $R_1$ indicates an alkyl group having 9 carbon atoms and n indicates 4 and alkyl (meth)acrylate represented by the foregoing general formula (2) wherein $R_2$ indicates an alkyl group having 4 carbon atoms. These monomers were mixed in a molar ratio of 1:1.

In each of the examples 33 to 38, in preparing a non-aqueous electrolyte solution, a mixed solvent containing ethylene carbonate and diethyl carbonate in a volume ratio of 1:1 was used, and a type of electrolyte dissolved in the mixed solvent was modified as shown in the following Table 6.

As the above-mentioned electrolyte, $LiN(CF_3SO_2)_2$ was used in the example 33, $LiN(C_3F_7SO_2)_2$ was used in the example 34, $LiN(C_4F_9SO_2)_2$ was used in the example 35, $LiN(C_5F_{11}SO_2)_2$ was used in the example 36, $LiPF_6$ was used in the example 37, and $LiBF_4$ was used in the example 38. Each of these electrolytes was respectively dissolved in the above-mentioned mixed solvents in a proportion of 1 mole/liter, to prepare each of the non-aqueous electrolyte solutions.

Each of the polymer electrolyte batteries in the examples 33 to 38 was fabricated in the same manner as that in the above-mentioned examples 1 to 6, except that each of the mixtures obtained by mixing two types of monomers as described above and the above-mentioned non-aqueous electrolyte solutions were mixed in a weight ratio 1:2, to prepare each solution for fabricating a polymer electrolyte.

With respect to each of the polymer electrolyte batteries according to the examples 33 to 38, the discharge capacities at the 1st cycle time and at the 100th cycle time were measured in the same manner as that in the above-mentioned case, to find the percentage of capacity retention (%) on the basis of the foregoing equation. The results, along with that of the above-mentioned example 4, are shown in the following Table 6.

TABLE 6

| | number of carbon atoms in $R_1$ | n | number of carbon atoms in $R_2$ | type of electrolyte | percentage of capacity retention (%) |
|---|---|---|---|---|---|
| example 4 | 9 | 4 | 4 | $LiN(C_2F_5SO_2)_2$ | 99 |
| example 33 | 9 | 4 | 4 | $LiN(CF_3SO_2)_2$ | 95 |
| example 34 | 9 | 4 | 4 | $LiN(C_3F_7SO_2)_2$ | 96 |
| example 35 | 9 | 4 | 4 | $LiN(C_4F_9SO_2)_2$ | 96 |
| example 36 | 9 | 4 | 4 | $LiN(C_5F_{11}SO_2)_2$ | 87 |
| example 37 | 9 | 4 | 4 | $LiPF_6$ | 89 |
| example 38 | 9 | 4 | 4 | $LiBF_4$ | 85 |

As apparent from the results, each of the polymer electrolyte batteries in the examples 33 to 38 presented increased percentage of capacity retention at the 100th cycle time and improved in charge/discharge cycle performance as compared with the polymer electrolyte batteries in the above-mentioned comparative examples 1 to 4.

Further, each of the polymer electrolyte batteries in the examples 4 and 33 to 35 employing as an electrolyte an imido electrolyte represented by $LiN(C_mF_{2m+1}SO_2)_2$ wherein m indicates an integer of 1 to 4 presented further increased percentage of capacity retention at the 100th cycle time and further improved in charge/discharge cycle performance as compared with the polymer electrolyte batteries in the examples 36 to 38 respectively employing imido electrolyte wherein the above-mentioned m indicates 5, $LiPF_6$, and $LiBF_4$.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A polymer electrolyte battery provided with a positive electrode, a negative electrode, and a polymer electrolyte, wherein
the polymer electrolyte comprises a polymer-based material containing a copolymer of ethylene glycol (meth) acrylate compound represented by a following general formula (1) and alkyl (meth)acrylate represented by a following general formula (2) and a non-aqueous solution:

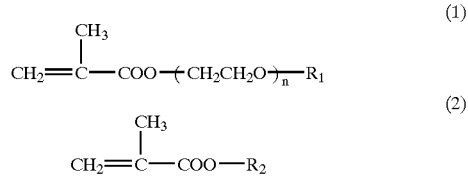

wherein n indicates an integer of not less than 1 while $R_1$ indicates an alkyl group having 1 or more carbon atoms in said general formula (1), and $R_2$ indicates an alkyl group having 4 or more carbon atoms in said general formula (2).

2. The polymer electrolyte battery according to claim 1, wherein
ethylene glycol (meth)acrylate compound represented by said general formula (1) wherein $R_1$ indicates an alkyl group having 9 or more carbon atoms is used.

3. The polymer electrolyte battery according to claim 1, wherein
ethylene glycol (meth)acrylate compound represented by said general formula (1) wherein n indicates an integer of 1 to 25 is used.

4. The polymer electrolyte battery according to claim 1, wherein
alkyl (meth)acrylate represented by said general formula (2) wherein $R_2$ indicates an alkyl group having 6 or more carbon atoms is used.

5. The polymer electrolyte battery according to claim 1, wherein
said polymer electrolyte contains an imido electrolyte represented by $LiN(C_mF_{2m+1}SO_2)_2$ wherein m indicates an integer of 1 to 4.

6. A method of fabricating a polymer electrolyte battery provided with a positive electrode, a negative electrode, and a polymer electrolyte, wherein
ethylene glycol (meth)acrylate compound represented by general formula (1)

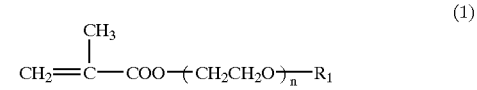

and alkyl (meth)acrylate represented by general formula (2)

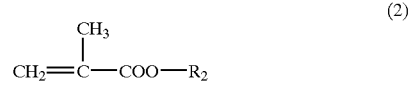

are copolymerized in the battery in non-aqueous solution to fabricate polymer electrolyte comprising a polymer-based material and the non-aqueous solution;
wherein n indicates an integer of not less than 1 while $R_1$ indicates an alkyl group having 1 or more carbon atoms, and $R_2$ indicates an alkyl group having 4 or more carbon atoms.

7. The method of fabricating a polymer electrolyte battery according to claim 6, wherein
in the ethylene glycol (meth)acrylate compound represented by said general formula (1), $R_1$ indicates an alkyl group having 9 or more carbon atoms.

8. The method of fabricating a polymer electrolyte battery according to claim 6, wherein
in the ethylene glycol (meth)acrylate compound represented by said general formula (1), n indicates an integer of 1 to 25.

9. The method of fabricating, a polymer electrolyte battery according to claim 6, wherein
in the alkyl (meth)acrylate represented by said general formula (2), $R_2$ indicates an alkyl group having 6 or more carbon atoms.

10. The method of fabricating a polymer electrolyte battery according to claim 6, wherein
said polymer electrolyte contains an imido electrolyte represented by $LiN(C_mF_{2m+1}SO_2)_2$ wherein m indicates an integer of 1 to 4.

11. A method of fabricating a polymer electrolyte battery provided with a positive electrode, a negative electrode, and a polymer electrolyte, wherein
a polymerization initiator is added to the battery so that ethylene glycol (meth)acrylate compound represented by general formula (1)

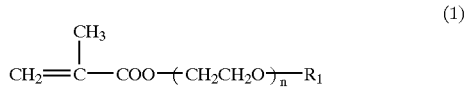

and alkyl (meth)acrylate represented by general formula (2)

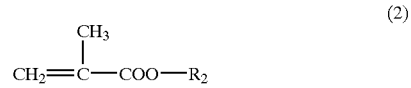

are copolymerized in the battery in non-aqueous solution to fabricate polymer electrolyte comprising a polymer-based material and the non-aqueous solution;

wherein n indicates an integer of not less than 1 while R$_1$ indicates an alkyl group having 1 or more carbon atoms, and R$_2$ indicates an alkyl group having 4 or more carbon atoms.

12. The method of fabricating a polymer electrolyte battery according to claim 11, wherein in the ethylene glycol (meth)acrylate compound represented by said general formula (1), R$_1$ indicates an alkyl group having 9 or more carbon atoms.

13. The method of fabricating a polymer electrolyte battery according to claim 11, wherein in the ethylene glycol (meth)acrylate compound represented by said general formula (1), n indicates an integer of 1 to 25.

14. The method of fabricating a polymer electrolyte battery according to claim 11, wherein in the alkyl (meth)acrylate represented by said general formula (2), R$_2$ indicates an alkyl group having 6 or more carbon atoms.

15. The method of fabricating a polymer electrolyte battery according to claim 11, wherein said polymer electrolyte contains an imido electrolyte represented by LiN(C$_m$F$_{2+1}$SO$_2$)$_2$ wherein m indicates an integer of 1 to 4.

16. The method of fabricating a polymer electrolyte battery according to claim 11, wherein a temperature at which said ethylene glycol (meth) acrylate compound and said alkyl (meth)acrylate are copolymerized is in the range of 40 to 80° C.

17. The method of fabricating a polymer electrolyte battery according to claim 11, wherein a time period for which said ethylene glycol (meth) acrylate compound and said alkyl (meth)acrylate are copolymerized is in the range of 1 to 20 hours.

* * * * *